United States Patent
Saito et al.

(10) Patent No.: US 11,493,240 B2
(45) Date of Patent: Nov. 8, 2022

(54) GAS EXPANSION SYSTEM

(71) Applicant: KAWASAKI JUKOGYO KABUSHIKI KAISHA, Kobe (JP)

(72) Inventors: Yuichi Saito, Akashi (JP); Hidetsugu Ishimaru, Kobe (JP); Ryota Takeuchi, Ikoma-gun (JP); Toshimitsu Adachi, Kobe (JP); Daisuke Kariya, Kobe (JP); Naoto Sakai, Osaka (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 381 days.

(21) Appl. No.: 16/759,588

(22) PCT Filed: Oct. 10, 2018

(86) PCT No.: PCT/JP2018/037640
§ 371 (c)(1),
(2) Date: Apr. 27, 2020

(87) PCT Pub. No.: WO2019/082642
PCT Pub. Date: May 2, 2019

(65) Prior Publication Data
US 2020/0292211 A1    Sep. 17, 2020

(30) Foreign Application Priority Data
Oct. 27, 2017    (JP) .............................. JP2017-208075

(51) Int. Cl.
*F25B 9/06* (2006.01)
*F16C 32/06* (2006.01)
(Continued)

(52) U.S. Cl.
CPC ................ *F25B 9/06* (2013.01); *F01D 15/00* (2013.01); *F16C 32/0603* (2013.01);
(Continued)

(58) Field of Classification Search
CPC .................................... F01D 25/16; F02C 7/28
See application file for complete search history.

(56) References Cited

U.S. PATENT DOCUMENTS 3,038,318 A    6/1962    Hänny
2014/0053598 A1*    2/2014    Ishimaru .................. F25J 1/001
62/606

FOREIGN PATENT DOCUMENTS

AU    2016280924 A1    1/2018
JP    2000-120402 A    4/2000
(Continued)

*Primary Examiner* — Richard A Edgar
(74) *Attorney, Agent, or Firm* — Oliff PLC

(57) ABSTRACT

The amount of consumption of gas is reduced when the gas is expanded to be cooled by using a plurality of expansion turbines. A high-pressure expansion turbine includes: a gas supply passage through which bearing gas is supplied to a bearing portion; and a gas discharge passage through which the bearing gas which has been supplied from the gas supply passage to the bearing portion is discharged from the bearing portion. A low-pressure expansion turbine includes: a gas supply passage through which the bearing gas is supplied to a bearing portion; and a gas discharge passage through which the bearing gas which has been supplied from the gas supply passage to the bearing portion is discharged from the bearing portion. The bearing gas discharged from the gas discharge passage of the high-pressure expansion turbine is supplied to the gas supply passage of the low-pressure expansion turbine.

6 Claims, 4 Drawing Sheets

(51) Int. Cl.
*F25J 1/00* (2006.01)
*F25J 1/02* (2006.01)
*F01D 15/00* (2006.01)
*F01D 25/16* (2006.01)
*F01D 25/22* (2006.01)
*F02C 7/28* (2006.01)

(52) U.S. Cl.
CPC ............... *F25J 1/003* (2013.01); *F25J 1/005* (2013.01); *F25J 1/0062* (2013.01); *F25J 1/0257* (2013.01); *F25J 1/0279* (2013.01); *F01D 25/16* (2013.01); *F01D 25/22* (2013.01); *F02C 7/28* (2013.01); *F05D 2240/52* (2013.01); *F05D 2240/55* (2013.01)

(56) References Cited

FOREIGN PATENT DOCUMENTS

| | | |
|---|---|---|
| JP | 2012-219711 A | 11/2012 |
| JP | 2017-008775 A | 1/2017 |

\* cited by examiner

GAS EXPANSION SYSTEM

TECHNICAL FIELD

The present invention relates to a gas expansion system including a plurality of expansion turbines arranged in series.

BACKGROUND ART

Conventionally known are gas expansion systems configured to produce cold by performing adiabatic expansion of gas, such as helium or hydrogen, with expansion turbines.

In such expansion turbines, gas bearings that use process gas are utilized to support rotating shafts in some cases. The gas bearings can be roughly classified into static pressure gas bearings and dynamic pressure gas bearings. The static pressure gas bearings are more advantageous than the dynamic pressure gas bearings in that: a load capacity is large; and contact between a bearing portion and the rotating shaft does not occur at the time of the start and stop of the expansion turbine.

PTL 1 discloses a technology in which: a static pressure gas bearing is used as a radial bearing among bearings of an expansion turbine; and bearing gas is supplied to the radial bearing.

CITATION LIST

Patent Literature

PTL 1: Japanese Laid-Open Patent Application Publication No. 2000-120402

SUMMARY OF INVENTION

Technical Problem

When applying the static pressure gas bearing, a high-pressure gas supply source, such as a compressor, is required in order to stably supply, to the bearing portion, gas having pressure equal to or more than predetermined pressure necessary to support the rotating shaft. Therefore, power consumption of a cryogenic freezer includes power consumption corresponding this compression driving force. When the amount of consumption of the bearing gas increases, energy efficiency of the cryogenic freezer may deteriorate. Especially in the cryogenic freezer, a plurality of expansion turbines may be used. If the supply of the bearing gas to the bearing portions is performed independently among the expansion turbines, the amount of consumption of the bearing gas increases.

The present invention was made under these circumstances, and an object of the present invention is to reduce the amount of consumption of bearing gas when producing cold by adiabatic expansion of gas with a plurality of expansion turbines arranged in series and configured such that rotating shafts are supported by static pressure gas bearings.

Solution to Problem

A gas expansion system of the present invention includes: a first expansion turbine including a first rotating shaft, a first impeller attached to the first rotating shaft and configured to, when the first rotating shaft rotates, expand a gas while taking the gas into the first impeller, a first bearing portion supporting the first rotating shaft, a first gas supply passage through which bearing gas is supplied to the first bearing portion, and a first gas discharge passage through which the bearing gas which has been supplied from the first gas supply passage to the first bearing portion is discharged from the first bearing portion; and a second expansion turbine including a second rotating shaft, a second impeller attached to the second rotating shaft and configured to, when the second rotating shaft rotates, expand a gas while taking the gas into the second impeller, a second bearing portion supporting the second rotating shaft, a second gas supply passage through which the bearing gas is supplied to the second bearing portion, and a second gas discharge passage through which the bearing gas which has been supplied from the second gas supply passage to the second bearing portion is discharged from the second bearing portion. The first expansion turbine and the second expansion turbine are connected to each other in series such that the gas expanded by the first impeller of the first expansion turbine and discharged is supplied to the second impeller of the second expansion turbine. The gas discharged from the first gas discharge passage is supplied to the second gas supply passage.

Advantageous Effects of Invention

Since the amount of consumption of the gas can be reduced when the gas is expanded to be cooled by using a plurality of expansion turbines, energy consumed by the supply of the gas can be reduced. Therefore, energy efficiency of the system can be improved.

DESCRIPTION OF EMBODIMENTS

Embodiment 1

Figure 1:
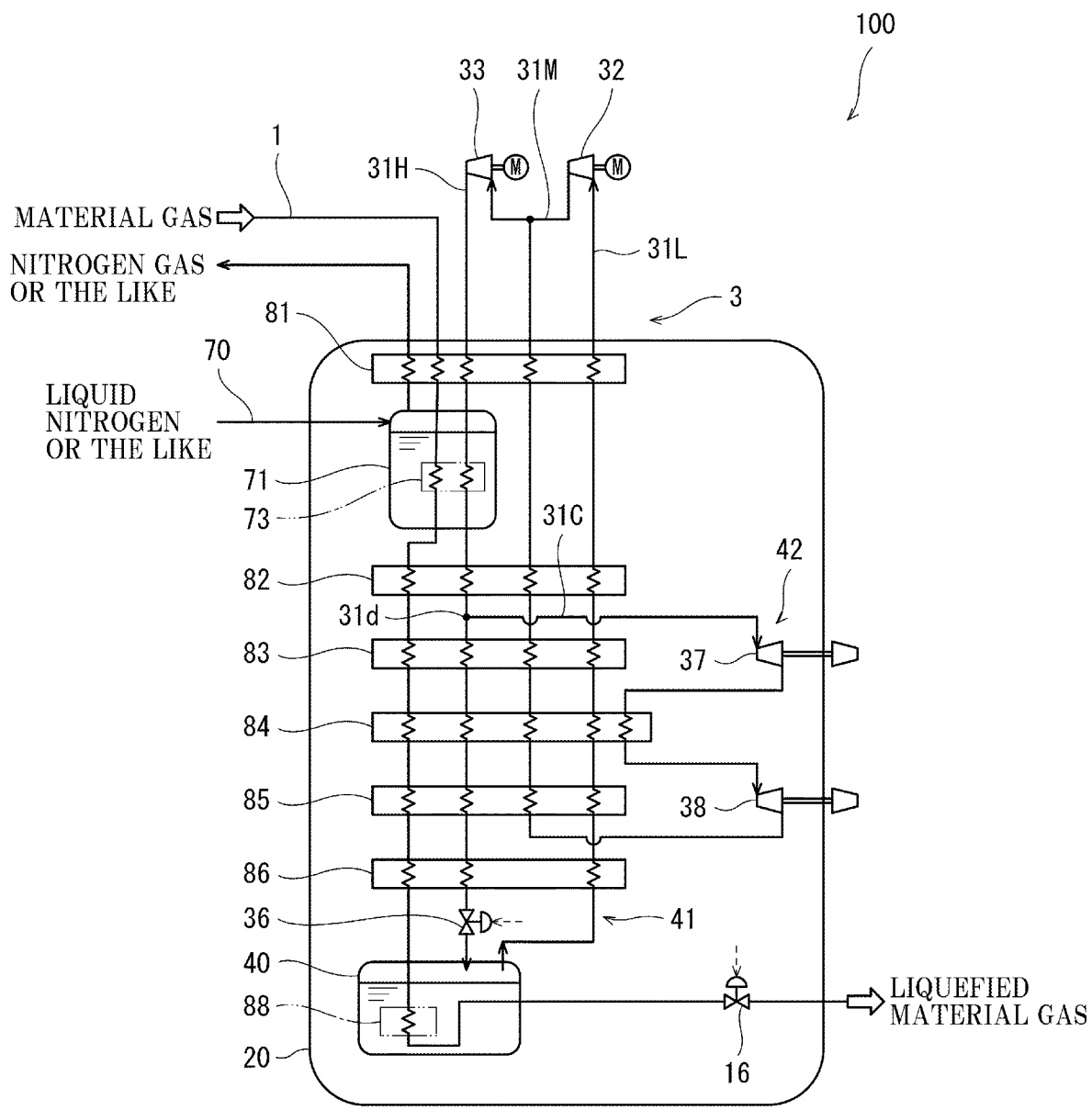
FIG. 1 is a configuration diagram showing a gas expansion system according to Embodiment 1 of the present invention.

Hereinafter, embodiments of the present invention will be described with reference to the attached drawings. FIG. 1 is an entire configuration diagram showing a gas expansion system according to Embodiment 1 of the present invention.

In the present embodiment, a cryogenic freezer 100 is described as the gas expansion system. The cryogenic freezer 100 cools a material gas, such as a hydrogen gas, supplied thereto to liquefy the material gas, i.e., generate a liquefied material gas. The material gas is cooled in a process of flowing through a feed line 1. Further, process gas, such as hydrogen, helium, or neon, used to cool the material gas circulates in a circulation line 3.

Configuration of Feed Line 1

The feed line 1 passes through a first heat exchanger 81, an initial cooler 73, second to sixth heat exchangers 82 to 86, a cooler 88, and a supply-system JT (Joule-Thomson) valve 16 in this order. In the heat exchangers 81 to 86, the material gas is cooled by heat exchange between the material gas and a cooling medium.

Further, the feed line 1 passes through the cooler 88 after passing through the sixth heat exchanger 86 and before passing through the supply-system JT valve 16. The cooler 88 includes a liquefied cooling medium storage tank 40 configured to store a liquefied cooling medium that is the cooling medium in a liquefied state in the cooling medium circulation line 3. The feed line 1 passes through an inside of the liquefied cooling medium storage tank 40. In the cooler 88, the material gas is cooled to about a temperature (i.e., an extremely low temperature) of the liquefied cooling medium by the liquefied cooling medium in the liquefied cooling medium storage tank 40.

The material gas having the extremely low temperature flows out from the cooler 88 and then passes through the supply-system JT valve 16 to become a liquid having low temperature and normal pressure. The material gas (i.e., the liquefied material gas) liquefied as above is supplied to and stored in a storage tank (not shown).

Configuration of Cooling Medium Circulation Line 3

The cooling medium circulation line 3 is a closed passage in which the cooling medium circulates. The cooling medium circulation line 3 is formed by: passages in the heat exchangers 81 to 86; a passage in the cooler 73; two compressors 32 and 33; two expansion turbines 37 and 38; a circulation-system Joule-Thomson valve (hereinafter referred to as a "circulation-system JT valve 36"); the liquefied cooling medium storage tank 40; passages in pipes connecting these components; and the like.

A cold heat generating route 42 of the cooling medium circulation line 3 passes through the high-pressure compressor 33, high-temperature cooling medium passages of the first and second heat exchangers 81 and 82, an expansion turbine at a high-pressure side (first expansion turbine; hereinafter referred to as a "high-pressure expansion turbine 37"), the fourth heat exchanger 84, an expansion turbine at a low-pressure side (second expansion turbine; hereinafter referred to as a "low-pressure expansion turbine 38"), and low-temperature cooling medium passages of the fifth to first heat exchangers 85 to 81 in this order and returns to the high-pressure compressor 33. The cooling medium gas is expanded and cooled at the high-pressure expansion turbine 37 and the low-pressure expansion turbine 38 when passing through the high-pressure expansion turbine 37 and the low-pressure expansion turbine 38.

Configurations of High-pressure Expansion Turbine 37 and Low-pressure Expansion Turbine 38

The configurations of the high-pressure expansion turbine 37 and the low-pressure expansion turbine 38 will be described.

Figure 2:
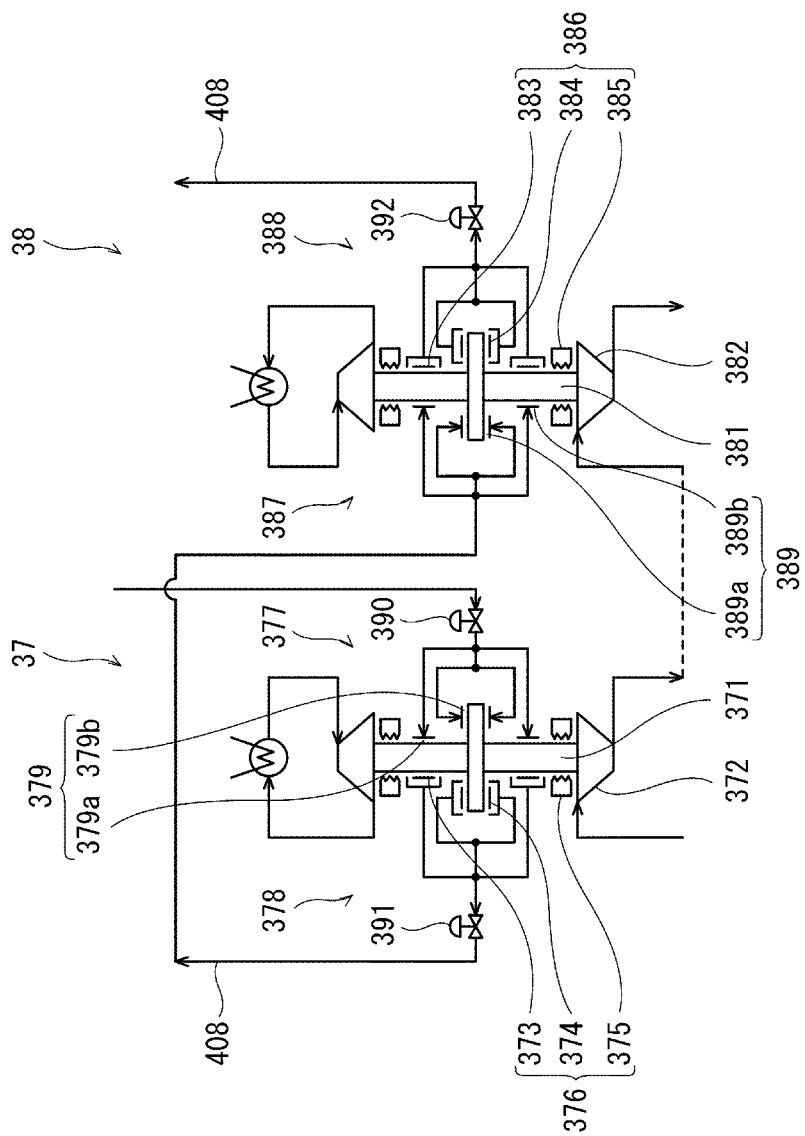
FIG. 2 is a configuration diagram showing a high-pressure expansion turbine and a low-pressure expansion turbine included in the gas expansion system shown in FIG. 1.

FIG. 2 is a configuration diagram showing the high-pressure expansion turbine 37 and the low-pressure expansion turbine 38. FIG. 2 shows gas supply passages through which gas is supplied to regions between rotating shafts and bearing portions in the high-pressure expansion turbine 37 and the low-pressure expansion turbine 38, and gas discharge passages.

As described above, in the present embodiment, the cooling medium is expanded by the two expansion turbines 37 and 38 to be reduced in temperature, i.e., to be cooled. Specifically, the cooling medium which has been expanded to be cooled by the high-pressure expansion turbine 37 is again expanded to be cooled by the low-pressure expansion turbine 38. With this, even when the cooling performance of a single expansion turbine is inadequate as performance of cooling the cooling medium, the cooling medium can be cooled again, and therefore, the cooling medium can be cooled more strongly.

The high-pressure expansion turbine 37 includes a rotating shaft (first rotating shaft) 371 configured to rotate when the high-pressure expansion turbine 37 is driven to be operated. An impeller (first impeller) 372 is attached to a first end of the rotating shaft 371. The impeller 372 rotates in accordance with the rotation of the rotating shaft 371.

The high-pressure expansion turbine 37 includes a bearing portion (first bearing portion) 376 supporting the rotating shaft 371. The bearing portion 376 includes a radial bearing portion (first radial bearing portion) 373 and a thrust bearing portion (first thrust bearing portion) 374. The radial bearing portion 373 supports the rotating shaft 371 in a radial direction, and the thrust bearing portion 374 supports the rotating shaft 371 in an axial direction of the rotating shaft.

The bearing portion 376 includes a sealing portion 375. The sealing portion 375 prevents the cooling medium from flowing toward a second end (opposite to the impeller 372) of the rotating shaft 371 along the axial direction of the rotating shaft 371.

In the high-pressure expansion turbine 37, since the impeller 372 rotates inside a cover, a gap is formed between a back surface of the impeller 372 and the cover. The cooling medium may pass through the gap and flow toward the second end (opposite to the impeller 372) of the rotating shaft 371 along the rotating shaft 371. To prevent the cooling medium from flowing toward the second end of the rotating shaft 371, the sealing portion 375 is arranged at a position which is close to the back surface of the impeller around the rotating shaft 371 and blocks the flow of the cooling medium along the rotating shaft 371. Since the sealing portion 375 is arranged at the position which blocks the flow of the cooling medium along the rotating shaft 371, the sealing portion 375 serves as resistance to the flow of the cooling medium toward the second end along the axial direction, and therefore, the amount of cooling medium leaking toward the second end can be reduced. Since the amount of cooling medium leaking toward the second end along the axial direction can be reduced, it is possible to prevent a case where the rotating shaft 371 and its peripheral parts are cooled by the cooling medium to be excessively reduced in temperature, and therefore, the rotating shaft 371 and its peripheral parts contract. With this, dimensional accuracy of the rotating shaft 371 and its peripheral parts can be maintained at a high level, and contact between the rotating shaft 371 and the bearing portion 376 during operation can be prevented. Since the contact between the rotating shaft 371 and the bearing portion 376 is prevented, the rotation of the rotating shaft 371 can be efficiently performed. Therefore, energy efficiency of the cryogenic freezer 100 as the gas expansion system can be improved. Further, the durability of the high-pressure expansion turbine 37 can be improved.

The high-pressure expansion turbine 37 includes a gas supply passage (first gas supply passage) 377 as a supply passage used when bearing gas is supplied to the bearing portion 376 (first bearing portion). A flow regulating valve 390 is provided at a passage located upstream of the gas supply passage 377. The flow regulating valve 390 adjusts the flow rate of the bearing gas flowing through the gas supply passage 377. The high-pressure expansion turbine 37 further includes a gas discharge passage (first gas discharge passage) 378. The bearing gas supplied from the gas supply passage 377 to the bearing portion 376 is discharged through the gas discharge passage 378. A flow regulating valve 391 is provided at a passage 408 located downstream of the gas discharge passage 378 and upstream of a gas supply passage 387 of the below-described low-pressure expansion turbine 38. The flow regulating valve 391 adjusts the flow rate of the bearing gas discharged from the gas discharge passage 378 and supplied to the gas supply passage 387 of the low-pressure expansion turbine 38.

It should be noted that the bearing portion 376 also includes a region (first region) 379 located between the rotating shaft 371 and the bearing.

In the present embodiment, the gas is supplied to the radial bearing portion 373 and the thrust bearing portion 374.

By supplying the gas to the radial bearing portion 373 by appropriate pressure and rotating the rotating shaft 371, the rotating shaft 371 floats from the radial bearing portion 373. In addition, the position of the rotating shaft 371 in the radial direction is maintained. Therefore, a noncontact state between the rotating shaft 371 and the radial bearing portion 373 is maintained. As above, when operating the high-pressure expansion turbine 37, the rotating shaft 371 can be rotated while realizing the noncontact state between the rotating shaft 371 and the radial bearing portion 373. Since the rotating shaft 371 rotates while realizing the noncontact state between the rotating shaft 371 and the radial bearing portion 373, resistance generated when the rotating shaft 371 rotates can be reduced. With this, energy consumption when operating the high-pressure expansion turbine 37 can be reduced, and operation efficiency of the cryogenic freezer 100 can be improved.

Further, by supplying the gas to the thrust bearing portion 374 by appropriate pressure and rotating the rotating shaft 371, the rotating shaft 371 can be maintained at an appropriate position in the axial direction. Therefore, a noncontact state between the rotating shaft 371 and the thrust bearing portion 374 is maintained. As above, when operating the high-pressure expansion turbine 37, the rotating shaft 371 can be rotated while realizing the noncontact state between the rotating shaft 371 and the thrust bearing portion 374. Since the rotating shaft 371 rotates without contacting the thrust bearing portion 374, resistance generated when the rotating shaft 371 rotates can be reduced. With this, the energy consumption when operating the high-pressure expansion turbine 37 can be further reduced, and the energy efficiency of the cryogenic freezer 100 can be further improved.

Similarly, the low-pressure expansion turbine 38 includes a rotating shaft (second rotating shaft) 381 which rotates when the low-pressure expansion turbine 38 is driven to be operated. An impeller (second impeller) 382 is attached to a first end of the rotating shaft 381. The impeller 382 rotates in accordance with the rotation of the rotating shaft 381.

The low-pressure expansion turbine 38 includes a bearing portion (second bearing portion) 386 supporting the rotating shaft 381. The bearing portion 386 includes a radial bearing portion (second radial bearing portion) 383 and a thrust bearing portion (second thrust bearing portion) 384. The radial bearing portion 383 supports the rotating shaft 381 in the radial direction, and the thrust bearing portion 384 supports the rotating shaft 381 in the axial direction of the rotating shaft.

The bearing portion 386 includes a sealing portion 385. The sealing portion 385 prevents the cooling medium from flowing toward a second end (opposite to the impeller 382) of the rotating shaft 381 along the axial direction of the rotating shaft 381. The sealing portion 385 is arranged at a position which is close to a back surface of the impeller 382 around the rotating shaft 381 and blocks the flow of the cooling medium along the rotating shaft 381.

Since the sealing portion 385 is arranged at the position which blocks the flow of the cooling medium along the rotating shaft 381, the sealing portion 385 serves as resistance to the flow of the cooling medium toward the second end along the axial direction, and therefore, the amount of cooling medium leaking toward the second end can be reduced. In the low-pressure expansion turbine 38, as with the above, since the amount of cooling medium leaking toward the second end along the axial direction can be reduced, it is possible to prevent a case where the rotating shaft 381 and its peripheral parts are cooled by the cooling medium to be excessively reduced in temperature, and therefore, the rotating shaft 381 and its peripheral parts contract. With this, dimensional accuracy of the rotating shaft 381 and its peripheral parts can be maintained at a high level, and contact between the rotating shaft 381 and the sealing portion 385 can be prevented. Since the contact between the rotating shaft 381 and the sealing portion 385 is prevented, the rotation of the rotating shaft 381 can be efficiently performed. Therefore, the energy efficiency of the cryogenic freezer 100 can be improved. Further, the durability of the low-pressure expansion turbine 38 can be improved.

The low-pressure expansion turbine 38 includes a gas supply passage (second gas supply passage) 387 as a supply passage used when the bearing gas is supplied to the bearing portion 386. The low-pressure expansion turbine 38 further includes a gas discharge passage (second gas discharge passage) 388. The gas supplied from the gas supply passage 387 to the bearing portion 386 is discharged through the gas discharge passage 388. A flow regulating valve 392 is provided at a passage located downstream of the gas discharge passage 388. The flow regulating valve 392 adjusts the flow rate of the bearing gas discharged from the gas discharge passage 388.

It should be noted that the bearing portion 386 also includes a region (second region) 389 located between the rotating shaft 381 and the bearing.

In the present embodiment, the gas is supplied to the radial bearing portion 383 and the thrust bearing portion 384.

By supplying the bearing gas to the radial bearing portion 383 of the low-pressure expansion turbine by appropriate pressure and rotating the rotating shaft 381 of the low-pressure expansion turbine, the rotating shaft 381 can be rotated without contacting the radial bearing portion 383. Therefore, resistance generated when the rotating shaft 381 rotates can be reduced. With this, the energy consumption when operating the low-pressure expansion turbine 38 can be reduced, and the operation efficiency of the cryogenic freezer 100 can be improved.

Further, by supplying the gas to the thrust bearing portion 384 by appropriate pressure, the rotating shaft 381 can be rotated without contacting the thrust bearing portion 384. Therefore, resistance generated when the rotating shaft 381 rotates can be reduced. With this, the energy consumption when operating the low-pressure expansion turbine 38 can be further reduced, and the operation efficiency of the cryogenic freezer 100 can be further improved.

The movement of the cooling medium flowing through the expansion turbines 37 and 38 of the cooling medium circulation line 3 in the cryogenic freezer 100 configured as above will be described.

The cooling medium which has been compressed by the high-pressure compressor 33 flows from the high-pressure compressor 33 through a high-pressure passage 31H to a branch portion 31d. As described above, by driving the high-pressure expansion turbine 37, most of the cooling medium branching at the branch portion 31d flows through a cold heat generating passage 31C toward the high-pressure expansion turbine 37.

When the cooling medium flows into the high-pressure expansion turbine 37, the cooling medium is expanded by the high-pressure expansion turbine 37. When the rotating shaft 371 rotates, and therefore, the impeller 372 rotates, the cooling medium is expanded while being taken into the high-pressure expansion turbine 37. When the cooling medium is expanded, the cooling medium is reduced in temperature.

The cooling medium which has been expanded in the high-pressure expansion turbine 37 passes through the fourth heat exchanger 84 and then flows toward the low-pressure expansion turbine 38.

Further, when the low-pressure expansion turbine 38 is driven, the cooling medium flows into the low-pressure expansion turbine 38, and the cooling medium is expanded by the low-pressure expansion turbine 38. When the rotating shaft 381 rotates, and therefore, the impeller 382 rotates, the cooling medium is expanded while being taken into the low-pressure expansion turbine 38. When the cooling medium is expanded, the cooling medium is further reduced in temperature in the low-pressure expansion turbine 38.

The cooling medium having extremely low temperature flows out from the low-pressure expansion turbine 38 and further flows from the fifth heat exchanger 85 to the first heat exchanger 81 in this order to be increased in temperature (i.e., to cool the cooling medium of the high-pressure passage 31H and the material gas). Then, the cooling medium joins the cooling medium of an intermediate-pressure passage 31M.

Next, the bearing gas supplied to the expansion turbines 37 and 38 will be described.

After the cooling medium is expanded by the high-pressure expansion turbine 37, the cooling medium is expanded by the low-pressure expansion turbine 38. Therefore, the pressure of the cooling medium while the cooling medium is being expanded by the high-pressure expansion turbine 37 is higher than the pressure of the cooling medium while the cooling medium is being expanded by the low-pressure expansion turbine 38. Therefore, in the present embodiment, the gas discharge passage 378 of the high-pressure expansion turbine 37 is connected to the gas supply passage 387 of the low-pressure expansion turbine 38. On this account, the gas discharged from the gas discharge passage 378 of the high-pressure expansion turbine 37 is supplied to the gas supply passage 387 of the low-pressure expansion turbine 38.

Typically, the pressure of the gas supplied to the region 379 in the high-pressure expansion turbine 37 is higher than the pressure of the gas supplied to the region 389 in the low-pressure expansion turbine 38. In this case, by connecting the gas discharge passage 378 of the high-pressure expansion turbine 37 to the gas supply passage 387 of the low-pressure expansion turbine 38, the gas which has been supplied to the region 379 in the high-pressure expansion turbine 37 can be supplied to the low-pressure gas supply passage 387 of the low-pressure expansion turbine 38. At this time, the gas can be supplied to the low-pressure gas supply passage 387 of the low-pressure expansion turbine 38 without specially providing a supply means for supplying the gas to the gas supply passage 387 of the low-pressure expansion turbine 38. Therefore, the configuration of the cryogenic freezer 100 can be simplified.

Further, the gas discharged from the bearing portion 376 of the high-pressure expansion turbine 37 is supplied to the bearing portion 386 of the low-pressure expansion turbine 38. Therefore, the gas used at the bearing portion 376 of the high-pressure expansion turbine 37 is used again at the bearing portion 386 of the low-pressure expansion turbine 38 before being discharged from the high-pressure expansion turbine 37 and the low-pressure expansion turbine 38. Since the same gas is used at both the bearing portion of the high-pressure expansion turbine 37 and the bearing portion of the low-pressure expansion turbine 38, the amount of consumption of the gas supplied to the bearing portion of the high-pressure expansion turbine 37 and the bearing portion of the low-pressure expansion turbine 38 can be reduced.

Further, the rotating shafts are positioned by the pressure of the gas supplied to the bearing portions of the expansion turbines 37 and 38. Therefore, the gas supplied to the bearing portions is required to have a certain degree of pressure. To increase the pressure of the gas supplied to the bearing portions, a step of pressurizing the gas, such as compressing the gas with a compressor, is required. In the present embodiment, part of the cooling medium which has been increased in pressure by the compressors 32 and 33 is supplied to the regions between the bearing portions and the rotating shafts in the expansion turbines 37 and 38.

When increasing the pressure of the cooling medium by driving the compressors 32 and 33, energy for driving the compressors 32 and 33 is consumed. If the amount of consumption of the gas supplied to the regions between the bearing portions and the rotating shafts increases, the amount of consumption of the energy correspondingly increases, and the energy efficiency of the system may deteriorate.

In the present embodiment, since the amount of consumption of the gas supplied to between the bearing portions and the rotating shafts in the high-pressure expansion turbine 37 and the low-pressure expansion turbine 38 can be reduced, the energy consumed in the system can be reduced. Therefore, the energy efficiency of the expansion system for the cooling medium can be improved.

Embodiment 2

Next, the gas expansion system according to Embodiment 2 of the present invention will be described. It should be noted that the same reference signs are used for the same components as in Embodiment 1, and explanations thereof are omitted, and only the different components will be described.

In Embodiment 1, regarding both the radial bearing portion supporting the rotating shaft in the radial direction and the thrust bearing portion supporting the rotating shaft in the axial direction, the gas which has been used in the high-pressure expansion turbine 37 is used also in the low-pressure expansion turbine 38. On the other hand, in Embodiment 2, regarding only the radial bearing portion supporting the rotating shaft in the radial direction, the gas which has been used in the high-pressure expansion turbine 37 is used also in the low-pressure expansion turbine 38. Further, regarding the thrust bearing portion supporting the rotating shaft in the axial direction, the gas which has been used in the high-pressure expansion turbine 37 is not used in the low-pressure expansion turbine 38.

Figure 3:
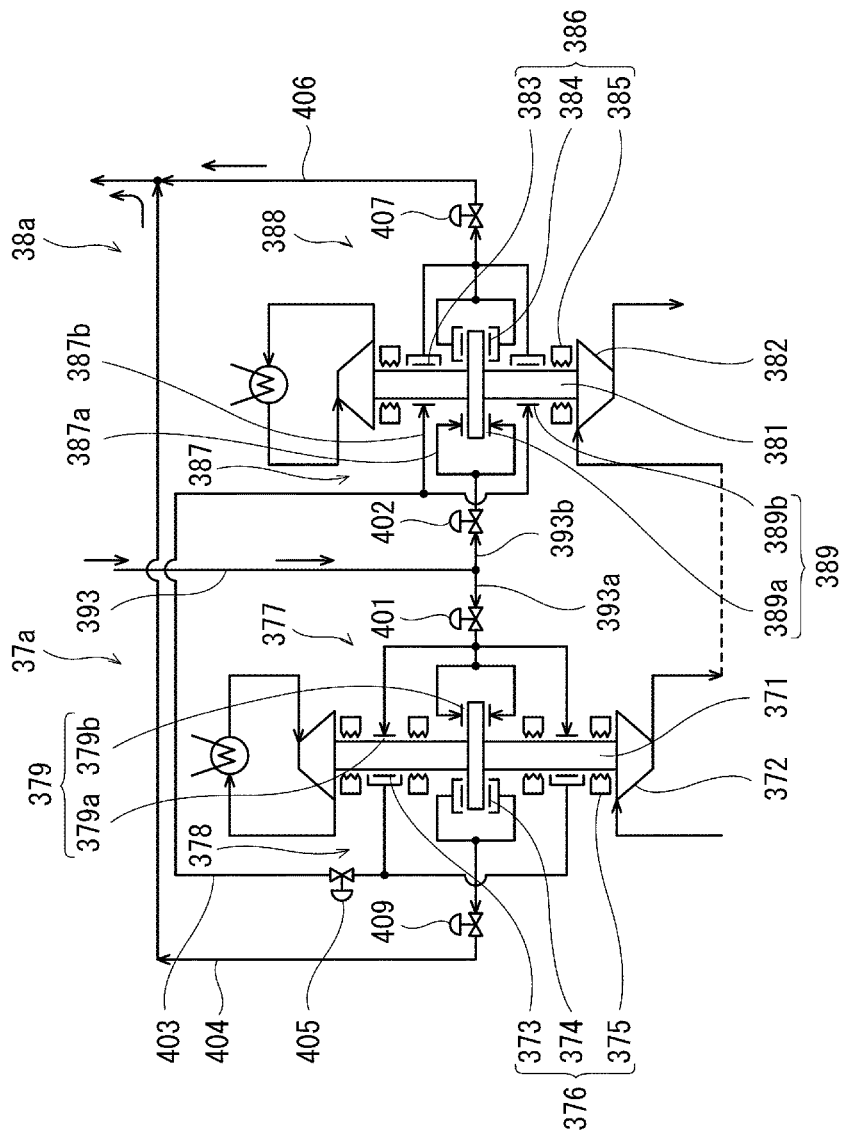
FIG. 3 is a configuration diagram showing the high-pressure expansion turbine and the low-pressure expansion turbine included in the gas expansion system according to Embodiment 2 of the present invention.

The configurations of the high-pressure expansion turbine and the low-pressure expansion turbine in Embodiment 2 will be described. FIG. 3 is a configuration diagram showing a high-pressure expansion turbine 37a and a low-pressure expansion turbine 38a in Embodiment 2.

In Embodiment 2, a passage 393 through which the gas is supplied to the high-pressure expansion turbine 37a and the low-pressure expansion turbine 38a branches. A passage 393a that is one of the branches of the passage 393 is connected to the high-pressure gas supply passage 377 of the high-pressure expansion turbine 37a. A flow regulating valve 401 configured to adjust the flow rate of the gas flowing through the passage 393a is provided at the passage 393a. A passage 393b that is the other of the branches of the passage 393 is connected to a gas supply passage 387a of the gas supply passage 387 of the low-pressure expansion turbine 38a, the gas supply passage 387a being provided for the thrust bearing portion 384. A flow regulating valve 402 configured to adjust the flow rate of the gas flowing through the passage 393b is provided at the passage 393b.

Since the passage 393a is connected to the high-pressure gas supply passage 377 of the high-pressure expansion turbine 37a, the rotating shaft 371 of the high-pressure expansion turbine 37a is positioned by the gas supplied from the compressors 32 and 33 through the passage 393 and the passage 393a.

In Embodiment 2, a passage 403 of the gas discharged from the radial bearing portion 373 among passages of the gas discharged from the gas discharge passage 378 in the high-pressure expansion turbine 37a is connected to a passage 387b of the gas supplied to the radial bearing portion 383 of the gas supply passage 387 in the low-pressure expansion turbine 38a. A flow regulating valve 405 is provided at the passage 403 of the gas discharged from the radial bearing portion 373 in the high-pressure expansion turbine 37a. The flow regulating valve 405 adjusts the flow rate of the gas flowing through the passage 403.

On the other hand, a passage 404 of the gas discharged from the thrust bearing portion 374 among the passages of the gas discharged from the gas discharge passage 378 of the high-pressure expansion turbine 37a is not connected to the gas supply passage 387 of the low-pressure expansion turbine 38a, and the gas flowing in the passage 404 is discharged to an outside. A flow regulating valve 409 configured to adjust the flow rate of the gas flowing through the passage 403 is provided at the passage 404.

At the thrust bearing portion 384 in the low-pressure expansion turbine 38a, the gas supply passage 387 is connected to the passage 393b. Therefore, the high-pressure gas from the compressor 32 and 33 is directly supplied to the thrust bearing portion 384 of the low-pressure expansion turbine 38a. Since the high pressure of the gas supplied to the thrust bearing portion 384 is maintained, the rotating shaft 381 of the low-pressure expansion turbine 38a is surely positioned.

As above, the gas which has been supplied to the thrust bearing portion 374 and discharged from a region 379b in the high-pressure expansion turbine 37a is not supplied to the thrust bearing portion 384 in the low-pressure expansion turbine 38a. The gas discharged from the thrust bearing portion 374 is not used as the bearing gas in a region 389b but passes through the passage 404 and is discharged to an outside from the high-pressure expansion turbine 37a and the low-pressure expansion turbine 38a.

At the radial bearing portion 383 of the low-pressure expansion turbine 38a, the gas discharge passage 378 of the high-pressure expansion turbine 37a is connected through the passage 403 to the gas supply passage 387 of the low-pressure expansion turbine 38a. Therefore, the gas discharged from the gas discharge passage 378 of the high-pressure expansion turbine 37a is supplied to the gas supply passage 387 of the low-pressure expansion turbine 38a. On this account, the gas which has been used in the high-pressure expansion turbine 37a is reused at the radial bearing portion 383 of the low-pressure expansion turbine 38a.

The gas which has been used at the radial bearing portion 383 and the thrust bearing portion 384 in the low-pressure expansion turbine 38a flows through a passage 406 and is discharged to an outside. A flow regulating valve 407 configured to adjust the flow rate of the gas discharged through the passage 406 to an outside is provided at the passage 406.

In Embodiment 2, the gas which has been used once at the radial bearing portion 373 of the high-pressure expansion turbine 37a is reused at the radial bearing portion 383 of the low-pressure expansion turbine 38a. Therefore, the same gas can be used at both the radial bearing portion of the high-pressure expansion turbine 37a and the radial bearing portion of the low-pressure expansion turbine 38a. With this, the amount of consumption of the gas can be reduced.

Typically, while the expansion turbine is being operated, a load applied to the thrust bearing portion is larger than a load applied to the radial bearing portion. Therefore, force required at the thrust bearing portion to position the rotating shaft is larger than force required at the radial bearing portion to position the rotating shaft. On this account, the gas supplied to the thrust bearing portion needs to be higher in pressure than the gas supplied to the radial bearing portion.

When the gas is supplied to the bearing portion and used for positioning the rotating shaft, the amount of gas supplied is adjusted by the flow regulating valve, and therefore, the pressure of the gas decreases thereat. On this account, the gas having higher pressure can be used when the gas compressed by the compressor 32 and 33 is supplied than when the gas discharged from the gas discharge passage 378 of the high-pressure expansion turbine 37a is reused. Thus, at the thrust bearing portion 384 to which a relatively large load is applied in the low-pressure expansion turbine 38a, the gas which has been used in the high-pressure expansion turbine 37a is not reused, and the high-pressure gas from the compressor 32 and 33 is directly supplied. Therefore, at the thrust bearing portions 374 and 384 which require high pressure, the rotating shafts 371 and 381 are positioned by the gas having high pressure. Thus, the positioning of the rotating shafts 371 and 381 can be surely performed.

On the other hand, since the loads applied to the radial bearing portions 373 and 383 are relatively small, the gas supplied to the radial bearing portions 373 and 383 does not have to have high pressure. Therefore, as the gas supplied to the radial bearing portion 383 of the low-pressure expansion turbine 38a, the gas which has been supplied once to the radial bearing portion 373 of the high-pressure expansion turbine 37a and has been reduced in pressure may be reused. With this, the amount of consumption of the gas can be reduced.

As above, the gas which has been used at the radial bearing portion 373 of the high-pressure expansion turbine 37a may be reused at the radial bearing portion 383 of the low-pressure expansion turbine 38a, and the gas which has been used at the thrust bearing portion 374 of the high-pressure expansion turbine 37a may not be used at the thrust bearing portion 384 of the low-pressure expansion turbine 38a.

Embodiment 3

Next, the gas expansion system according to Embodiment 3 of the present invention will be described. It should be noted that the same reference signs are used for the same components as in Embodiments 1 and 2, and explanations thereof are omitted, and only the different components will be described.

In Embodiment 1, the gas which has been used at the radial bearing portion and the thrust bearing portion in the high-pressure expansion turbine is reused at the radial bearing portion and the thrust bearing portion in the low-pressure expansion turbine. In Embodiment 2, the gas which has been used between the rotating shaft and the radial bearing portion in the high-pressure expansion turbine is reused at the radial bearing portion of the low-pressure expansion turbine. Further, in Embodiment 3, the gas which has been used in the region between the radial bearing portion and the rotating shaft in the high-pressure expansion turbine and the region between the thrust bearing portion and the rotating shaft in the high-pressure expansion turbine is reused in a region between the sealing portion and the rotating shaft in the low-pressure expansion turbine.

Figure 4:
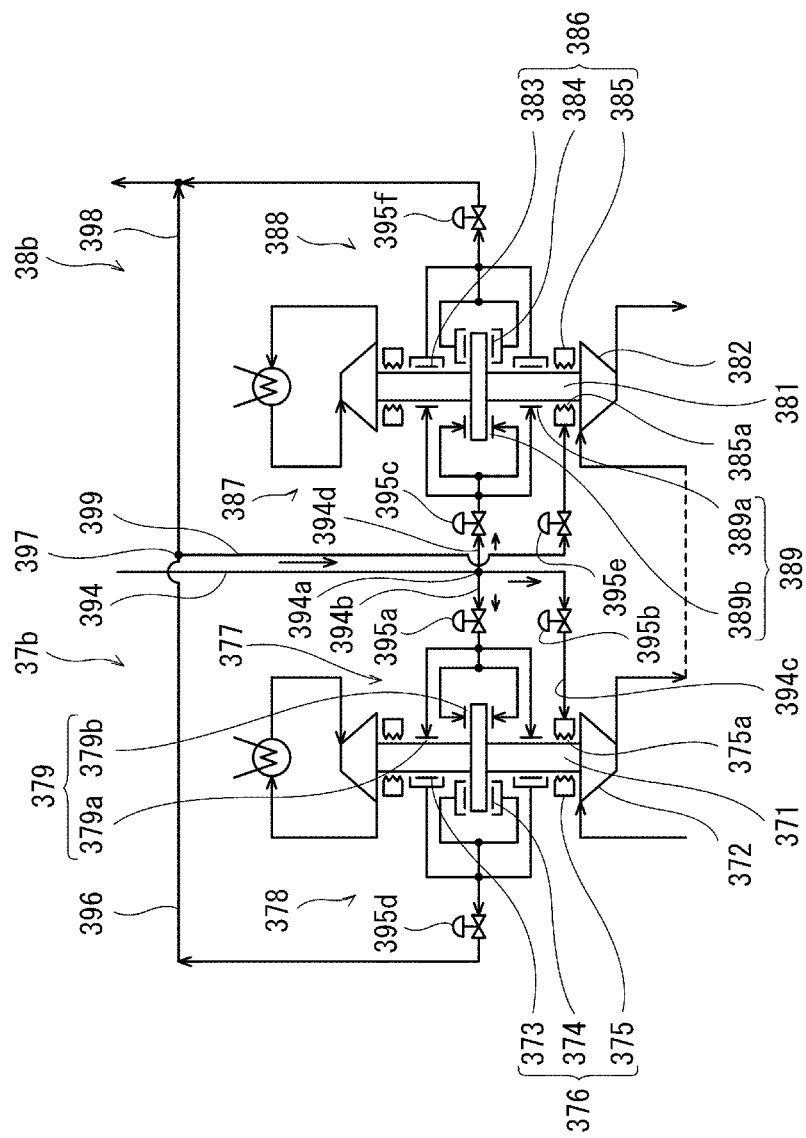
FIG. 4 is a configuration diagram showing the high-pressure expansion turbine and the low-pressure expansion turbine included in the gas expansion system according to Embodiment 3 of the present invention.

FIG. 4 is a configuration diagram showing a high-pressure expansion turbine 37b and a low-pressure expansion turbine 38b in Embodiment 3.

In Embodiment 3, a passage 394 through which the gas is supplied to the high-pressure expansion turbine 37b and the low-pressure expansion turbine 38b branches into three. One of the branches of the passage 394 is connected to the radial bearing portion 373 and the thrust bearing portion 374 in the high-pressure expansion turbine 37b. With this, the gas can be supplied to the radial bearing portion 373 and the thrust bearing portion 374 in the high-pressure expansion turbine 37b.

Another one of the branches of the passage 394 is connected to the sealing portion 375 of the high-pressure expansion turbine 37b. With this, the gas can be supplied to a region 375a between the sealing portion 375 and the rotating shaft 371 in the high-pressure expansion turbine.

The other one of the branches of the passage 394 is connected to the radial bearing portion 383 and the thrust bearing portion 384 in the low-pressure expansion turbine 38b. With this, the gas can be supplied to the radial bearing portion 383 and the thrust bearing portion 384 in the low-pressure expansion turbine 38b.

A flow regulating valve 395a is provided at a passage 394b extending from a gas passage branch point 394a to the radial bearing portion 373 and the thrust bearing portion 374 in the high-pressure expansion turbine 37b. The flow regulating valve 395a can adjust the amount of gas supplied to the radial bearing portion 373 and the thrust bearing portion 374 in the high-pressure expansion turbine 37b.

A flow regulating valve 395b is provided at a passage 394c extending from the gas passage branch point 394a to the sealing portion 375 of the high-pressure expansion turbine 37b. The flow regulating valve 395b can adjust the amount of gas supplied to the sealing portion 375 of the high-pressure expansion turbine 37b.

A flow regulating valve 395c is provided at a passage 394d extending from the gas passage branch point 394a to the radial bearing portion 383 and the thrust bearing portion 384 in the low-pressure expansion turbine 38b. The flow regulating valve 395c can adjust the amount of gas supplied to the radial bearing portion 383 and the thrust bearing portion 384 in the low-pressure expansion turbine 38b.

A flow regulating valve 395d capable of adjusting the flow rate of the gas is provided at a passage located downstream of the gas discharge passage 378 of the high-pressure expansion turbine 37b. The flow regulating valve 395d can adjust the flow rate of the gas discharged from the gas discharge passage 378 of the high-pressure expansion turbine 37b.

The gas discharged from the radial bearing portion 373 and thrust bearing portion 374 of the high-pressure expansion turbine 37b passes through a passage 396 and then branches at a branch point 397. A passage 398 that is one of passages branching at the branch point 397 is connected to an outside. Therefore, the gas passing through the passage 398 is discharged to an outside. A passage 399 that is the other of the passages branching at the branch point 397 is connected to the sealing portion 385 of the low-pressure expansion turbine 38b. A flow regulating valve 395e capable of adjusting the flow rate of the gas is provided at the passage 399. The flow regulating valve 395e can adjust the amount of gas supplied to the sealing portion 385 of the low-pressure expansion turbine 38b.

A flow regulating valve 395f capable of adjusting the flow rate of the gas discharged from the gas discharge passage 388 is provided at a passage located downstream of the gas discharge passage 388 of the low-pressure expansion turbine 38b. The flow regulating valve 395f can adjust the flow rate of the gas discharged from the radial bearing portion 383 and thrust bearing portion 384 of the low-pressure expansion turbine 38b.

By supplying the high-pressure gas to a region 385a between the sealing portion 385 and the rotating shaft 381 in the low-pressure expansion turbine 38b, the cooling medium can be pushed back toward the low-pressure impeller 382 in the region 385a between the sealing portion 385 and the rotating shaft 381. Since the cooling medium is pushed back toward the impeller 382, the cooling medium can be prevented from passing through the region 385a between the sealing portion 385 and the rotating shaft 381. Therefore, the cooling medium can be further prevented from flowing toward a position which is located at the second end side (an opposite side of the impeller 382) across the sealing portion 385. At this time, the gas supplied to the sealing portion 385 serves as seal gas that pushes the cooling medium from the sealing portion 385 toward the first end. Since the cooling medium is prevented from flowing toward the position at the second end side opposite to the impeller 382, the deterioration of the dimensional accuracy of the rotating shaft and the bearing portion by the cooling of the rotating shaft and the bearing portion can be prevented.

The seal gas supplied to the region 385a between the sealing portion 385 and the rotating shaft 381 in the low-pressure expansion turbine 38b is discharged and collected by flowing into the gas discharge passage 388 to which the gas is discharged from a region 389a between the radial bearing portion 383 and the rotating shaft 381 and the region 389b between the thrust bearing portion 384 and the rotating shaft 381.

Further, in Embodiment 3, part of the gas which has been used in a region 379a between the rotating shaft 371 and the radial bearing portion 373 in the high-pressure expansion turbine 37b and the region 379b between the thrust bearing portion 374 and the rotating shaft 371 branches at the branch point 397 and is reused in the region 385a between the sealing portion 385 and the rotating shaft 381 in the low-pressure expansion turbine 38b.

In Embodiment 3, the gas flowing through the passage (second gas supply passage) 399 and then supplied to the sealing portion 385 in the low-pressure expansion turbine 38b serves as the seal gas that pushes out the cooling medium from the region 385a between the sealing portion 385 and the rotating shaft 381 toward the first end (toward the low-pressure impeller 382) of the rotating shaft 381 along the axial direction of the rotating shaft 381.

As above, in Embodiment 3, the gas discharged from the region 379a between the radial bearing portion 373 and the rotating shaft 371 in the high-pressure expansion turbine 37b and the region 379b between the thrust bearing portion 374 and the rotating shaft 371 in the high-pressure expansion turbine 37b is supplied to the region 385a between the sealing portion 385 and the rotating shaft 381 in the low-pressure expansion turbine 38b. Therefore, the gas which has been used in the region 379a between the radial bearing portion 373 and the rotating shaft 371 in the high-pressure expansion turbine 37 and the region 379b between the thrust bearing portion 374 and the rotating shaft 371 in the high-pressure expansion turbine 37 is reused in the region 385a between the sealing portion 385 and the rotating shaft 381 in the low-pressure expansion turbine 38b before being discharged from the high-pressure expansion turbine 37b and the low-pressure expansion turbine 38b. The gas used in the region 379a between the radial bearing portion 373 and the rotating shaft 371 in the high-pressure expansion turbine 37b and the region 379b between the thrust bearing portion 374 and the rotating shaft 371 in the high-pressure expansion turbine 37b and the gas used in the region 385a between the sealing portion 385 and the rotating shaft 381 in the low-pressure expansion turbine 38b are the same gas. With this, the amount of consumption of the gas supplied to between the bearing portion 376 and the rotating shaft 371 in the high-pressure expansion turbine 37b and to between the bearing portion 386 and the rotating shaft 381 in the low-pressure expansion turbine 38b can be reduced. Therefore, the energy consumed in the system can be reduced. Thus, the energy efficiency of the cryogenic freezer 100 can be improved.

The cooling medium is low in pressure in a region around the impeller 382 where the expansion is performed in the low-pressure expansion turbine 38b. Therefore, the pressure is low in the region 385a between the sealing portion 385 and the rotating shaft 381 in the low-pressure expansion turbine 38b. On this account, the pressure in the region 385a between the sealing portion 385 and the rotating shaft 381 in the low-pressure expansion turbine 38b is lower than the pressure in the gas discharge passage 378 of the high-pressure expansion turbine 37b. Thus, a pressure difference is generated between the gas discharge passage 378 of the high-pressure expansion turbine 37b and the region 385a between the sealing portion 385 and the rotating shaft 381 in the low-pressure expansion turbine 38b. With this, by connecting the gas discharge passage 378 of the high-pressure expansion turbine 37b and the region 385a of the low-pressure expansion turbine 38b, the gas discharged from the gas discharge passage 378 can be supplied to the region 385a without specially providing a supply means between the gas discharge passage 378 and the region 385a. Therefore, such supply means for supplying the gas to the region 385a can be omitted from the expansion system for the cooling medium, and a configuration of supplying the gas to the region 385a is simplified. Thus, the manufacturing cost of the cryogenic freezer 100 can be reduced.

Other Embodiments

The above embodiments have described that the cooling medium is expanded to be cooled by using two expansion turbines that are the high-pressure expansion turbine and the low-pressure expansion turbine. However, the present invention is not limited to the above embodiments, and the other embodiments may be adopted. For example, an embodiment in which a plurality of (three or more) expansion turbines are used, and the cooling medium is expanded to be used by these expansion turbines may be adopted. In this case, the supply of the gas to the region between the bearing portion and the rotating shaft by the reuse of the gas as described in the above embodiments may be performed between any two of the plurality of expansion turbines.

Further, when a plurality of expansion turbines are used, and the reuse of the gas supplied to between the bearing portion and the rotating shaft is performed between some of the expansion turbines, the present invention is not limited to an embodiment in which the reuse of the gas is performed only between the expansion turbines continuously connected to each other. The reuse of the gas supplied to between the bearing portion and the rotating shaft may be performed between any of the plurality of expansion turbines.

Further, the above embodiments have described that the gas which has been used in the high-pressure expansion turbine in which the pressure of the cooling medium is relatively high is reused in the low-pressure expansion turbine in which the pressure of the cooling medium is relatively low. However, the present invention is not limited to the above embodiments. When the pressure of the gas used in the low-pressure expansion turbine is higher than the pressure of the gas used in the high-pressure expansion turbine, an embodiment in which the gas which has been used in the low-pressure expansion turbine is reused in the high-pressure expansion turbine may be adopted.

Further, the above embodiments have described that the gas compressed by the compressor is used as the high-pressure gas used at the bearing portion to position the rotating shaft. However, the present invention is not limited to the above embodiments. The positioning of the rotating shaft may be performed by a high-pressure gas increased in pressure by another compressor. Further, the positioning of the rotating shaft may be performed by a gas increased in pressure by another means other than a compressor.

REFERENCE SIGNS LIST 37 high-pressure expansion turbine
371 rotating shaft of high-pressure expansion turbine
372 high-pressure impeller
376 bearing portion of high-pressure expansion turbine
377 high-pressure gas supply passage
378 high-pressure gas discharge passage
low-pressure expansion turbine
381 rotating shaft of low-pressure expansion turbine
382 low-pressure impeller
386 bearing portion of low-pressure expansion turbine
387 low-pressure gas supply passage
388 low-pressure gas discharge passage

The invention claimed is:

1. A gas expansion system comprising:
a first expansion turbine including
   a first rotating shaft,
   a first impeller attached to the first rotating shaft and configured to, when the first rotating shaft rotates, expand a gas while taking the gas into the first impeller,
   a first bearing portion supporting the first rotating shaft,
   a first gas supply passage through which bearing gas is supplied to the first bearing portion, and
   a first gas discharge passage through which the bearing gas which has been supplied from the first gas supply passage to the first bearing portion is discharged from the first bearing portion; and
a second expansion turbine including
   a second rotating shaft,
   a second impeller attached to the second rotating shaft and configured to, when the second rotating shaft rotates, expand the gas while taking the gas into the second impeller,
   a second bearing portion supporting the second rotating shaft,
   a second gas supply passage through which the bearing gas is supplied to the second bearing portion, and
   a second gas discharge passage through which the bearing gas which has been supplied from the second gas supply passage to the second bearing portion is discharged from the second bearing portion, wherein:
the first expansion turbine and the second expansion turbine are connected to each other in series such that the gas expanded by the first impeller of the first expansion turbine is supplied to the second impeller of the second expansion turbine;
the first gas discharge passage and the second gas supply passage are directly connected to each other; and
the bearing gas discharged from the first gas discharge passage is directly supplied to the second gas supply passage.

2. The gas expansion system according to claim 1, wherein:
the first bearing portion includes a first radial bearing portion supporting the first rotating shaft in a radial direction; and
the second bearing portion includes a second radial bearing portion supporting the second rotating shaft in the radial direction.

3. The expansion system according to claim 2, wherein:
the first bearing portion includes a first thrust bearing portion supporting the first rotating shaft in an axial direction; and
the second bearing portion includes a second thrust bearing portion supporting the second rotating shaft in the axial direction.

4. The expansion system according to claim 1, wherein:
the first expansion turbine includes
   a first radial bearing portion supporting the first rotating shaft in a radial direction and
   a first thrust bearing portion supporting the first rotating shaft in an axial direction;
the second expansion turbine includes
   a second radial bearing portion supporting the second rotating shaft in a radial direction and
   a second thrust bearing portion supporting the second rotating shaft in an axial direction;
the first bearing portion is only the first radial bearing portion out of the first radial bearing portion and the first thrust bearing portion; and
the second bearing portion is only the second radial bearing portion out of the second radial bearing portion and the second thrust bearing portion.

5. The expansion system according to claim 1, wherein:
the second bearing portion is a sealing portion configured to prevent the gas, expanded by the second impeller attached to a first end of the second rotating shaft, from flowing toward a second end of the second rotating shaft along the axial direction of the second rotating shaft; and
the bearing gas supplied through the second gas supply passage to the sealing portion is higher in pressure than the gas expanded by the second impeller.

6. The expansion system according to claim 5, wherein the bearing gas is seal gas that pushes out the gas from the sealing portion toward the first end.

* * * * *